US012779870B2

(12) United States Patent
Shahrestani

(10) Patent No.: US 12,779,870 B2
(45) Date of Patent: Nov. 3, 2026

(54) SYSTEM FOR DELIVERING INK TO A PRINTHEAD

(71) Applicant: MAPLEJET LIMITED, Aurora (CA)

(72) Inventor: Homayoun Shahrestani, Thornhill (CA)

(73) Assignee: MAPLEJET LIMITED, Richmond Hill (CA)

( * ) Notice: Subject to any disclaimer, the term of this patent is extended or adjusted under 35 U.S.C. 154(b) by 43 days.

(21) Appl. No.: 18/718,256

(22) PCT Filed: Dec. 8, 2022

(86) PCT No.: PCT/CA2022/051796
§ 371 (c)(1),
(2) Date: Jun. 10, 2024

(87) PCT Pub. No.: WO2023/102662
PCT Pub. Date: Jun. 15, 2023

(65) Prior Publication Data

US 2025/0050652 A1 Feb. 13, 2025

Related U.S. Application Data

(60) Provisional application No. 63/288,269, filed on Dec. 10, 2021.

(51) Int. Cl.
*B41J 2/175* (2006.01)
*B41J 2/19* (2006.01)

(52) U.S. Cl.
CPC ....... *B41J 2/17596* (2013.01); *B41J 2/17556* (2013.01); *B41J 2/17566* (2013.01); *B41J 2/19* (2013.01); *B41J 2002/17516* (2013.01)

(58) Field of Classification Search
CPC ................ B41J 2/17596; B41J 2/17556; B41J 2/17566; B41J 2/19; B41J 2002/17516
See application file for complete search history.

(56) References Cited

U.S. PATENT DOCUMENTS

| | | | |
|---|---|---|---|
| 5,788,388 | A | 8/1998 | Cowger et al. |
| 5,847,734 | A | 12/1998 | Pawlowski, Jr. |
| 6,224,201 | B1 | 5/2001 | Shigemura |

FOREIGN PATENT DOCUMENTS

| | | | |
|---|---|---|---|
| WO | WO-2021132283 A1 * | 7/2021 | ................ B41J 2/18 |

OTHER PUBLICATIONS

Hattori et al., "Inkjet Printer" (WO 2021/132283 A1), Jul. 7, 2021, [Abstract, Description of Embodiments] (Year: 2021).*

(Continued)

*Primary Examiner* — Lisa Solomon

(57) ABSTRACT

A system for delivering ink to a printhead is for use with an ink reservoir. The ink delivery system includes an ink delivery device, a vacuum pump, a bladder, a sensor, a separator and a controller. The ink delivery device is connectable to and in fluid communication with the ink reservoir. The vacuum pump is operably connected to and in fluid communication with the ink reservoir. The bladder defines a volume. The sensor is operably connected to the bladder and the sensor generates a signal responsive to volume of ink in the bladder. The separator is operably connected to and in fluid communication with the ink delivery device, the vacuum pump and the bladder. The controller is operably connected to the sensor for determining the change in the size of the bladder and thereby determining ink usage and the controller being operably connected to the ink delivery device.

20 Claims, 10 Drawing Sheets

(56) References Cited

OTHER PUBLICATIONS

Indian Application 202417032134, Office Action, dated Jul. 13, 2026, 10 pages.

* cited by examiner

SYSTEM FOR DELIVERING INK TO A PRINTHEAD

BACKGROUND

The present disclosure relates to printers and more specifically to a system for delivering ink to a printhead.

Ink jet printing is a type of computer printing that creates a digital image by propelling droplets of ink onto paper and plastic substrates. Inkjet printers have been widely used for a number of years. Inkjet printers are used in a wide variety of industry sectors including food, beverage, pharmaceutical or personal care and building materials.

Many inkjet printers use replaceable ink cartridges. Thus, an inkjet printer that is heavily used will require frequent replacement cartridges. This can require a person to frequently monitor the usage to minimize the down time when changing the cartridge. As well, the spent cartridge produces waste.

Some inkjet printers are provided with a bulk ink supply. However, some of these systems do not have a method of priming the system, nor do they have a method of accurately measuring the ink usage.

Accordingly, it would be advantageous to provide a reliable method of determining the ink usage to ensure that the ink being used is measured accurately. Further it would be advantageous to provide a method of priming the bulk ink supply for an inkjet printer.

SUMMARY

A system for delivering ink to a printhead is for use with an ink reservoir. The ink delivery system includes an ink delivery device, a vacuum pump, a bladder, a sensor, a separator and a controller. The ink delivery device is connectable to and in fluid communication with the ink reservoir. The vacuum pump is operably connected to and in fluid communication with the ink reservoir. The bladder defines a volume. The sensor is operably connected to the bladder and the sensor generates a signal responsive to volume of ink in the bladder. The separator is operably connected to and in fluid communication with the ink delivery device, the vacuum pump and the bladder. The controller is operably connected to the sensor for determining the change in the size of the bladder and thereby determining ink usage and the controller being operably connected to the ink delivery device.

A system for delivering ink to a printhead for use with an ink reservoir, the ink delivery includes an ink delivery device, a bladder, a sensor, and a controller. The ink delivery device is connectable to and in fluid communication with the ink reservoir. The bladder defines a volume. The bladder is operably connected to and in fluid communication with the ink delivery device. The bladder has a diaphragm as a portion thereof. The sensor is operably connected to the diaphragm, the sensor generating a signal responsive to movement of the diaphragm. The controller is operably connected to the sensor for determining the change in the size of the bladder and thereby determining ink usage and the controller being operably connected to the ink delivery device.

The ink delivery device may be an ink pump. The ink pump may be a high precision micro pump.

The ink delivery system may further include a valve operably connected and in fluid communication between the ink pump and the ink reservoir.

The sensor may be an induction sensor.

The bladder may be an aluminum bag.

The ink delivery system may further include a spring operably attached to the inside of the bladder and configured to apply pressure to the bladder. Changes in the spring may correspond to ink usage.

The controller may activate the ink delivery device to deliver ink from the ink reservoir based on the determined ink usage.

The sensor may be an induction sensor.

The controller may active the ink delivery device to deliver ink from the ink reservoir based on the determined ink usage.

The ink delivery system may include a separator and a vacuum pump wherein the ink delivery device is operably connected to and in flow communication with the separator, the vacuum pump is operably connected to and in fluid communication with the separator and the ink reservoir, and the separator is operably connected to and fluid communication with the bladder.

The ink reservoir may be positioned to provide ink under pressure to the bladder and the ink delivery device is a valve.

A method of priming a bladder for use with an inkjet printing system, and an ink reservoir, the ink delivery system having a bladder, an ink delivery device for delivering ink to the bladder, a separator in fluid connection with the bladder and a vacuum pump in fluid connection with the separator, and a sensor operably connected to the bladder, the method comprising the steps of:

- checking the seal between the bladder and the separator and determining if within acceptable limits;
- if within acceptable limits then pouring ink into bladder;
- vacuuming air out of bladder;
- determining if bladder level within a predetermined range.

The checking step may include the steps of taking a first sensor reading; vacuuming the air out of the bladder; taking a second sensor reading; determining if the second reading is less than the first reading AND determining if the first reading less the second reading is greater than a minimum predetermined change; if yes then proceeding.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein the "operably connected" or "operably attached" means that the two elements are connected or attached either directly or indirectly. Accordingly, the items need not be directly connected or attached but may have other items connected or attached therebetween.

Figure 1:
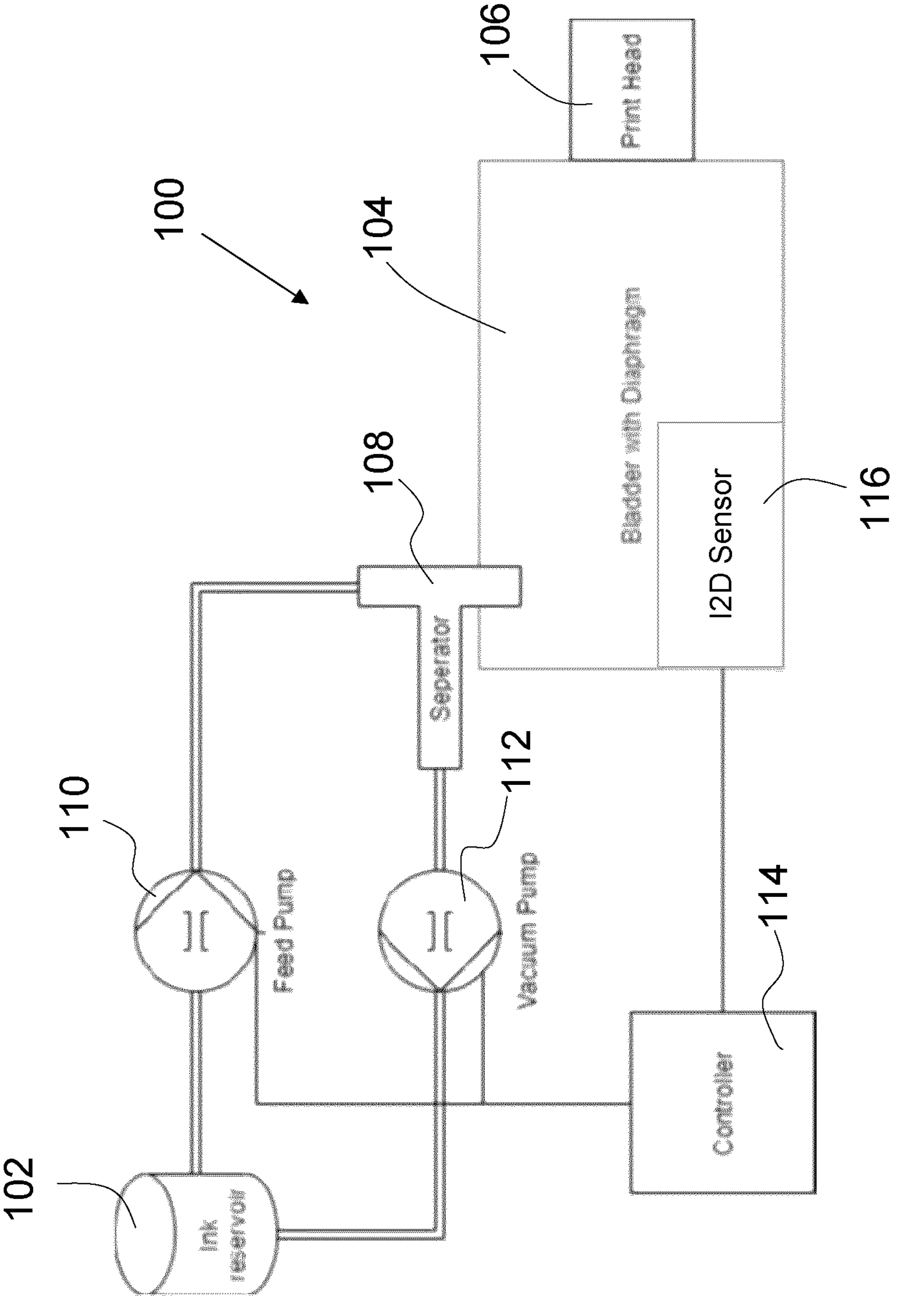
FIG. 1 is a schematic diagram of a system for delivering ink to a printhead.

A schematic diagram of one embodiment of the system for delivering ink to a printhead is shown generally at 100 in FIG. 1. The system 100 includes an ink reservoir 102 operably in flow communication with ink bladder 104. Ink bladder 104 provides ink to the printhead 106. The bladder 104 contains certain amount of ink and acts as small reservoir to deliver the ink to printhead 106 at correct pressure required by the printhead. The ink reservoir 102 is operably connected to the ink bladder 104 through a separator 108. An ink pump or feed pump 110 pumps ink from the ink reservoir 102 into the separator 108. In the separator 108 air that has entered the system is removed using a vacuum pump 112. The ink bladder 104 includes a diaphragm and a sensor 116 is operably connected to the diaphragm. A controller 114 is operably connected to the ink pump 110, the vacuum pump 112 and the sensor 116.

The sensor 116 is configured to generate a signal dependent on movement of the diaphragm of the ink bladder 104. During actuation of the printhead 106, the resulting vacuum draws ink from the ink bladder 104, compressing the ink bladder 104, and leading to a change in signal that is correlated with the volume of ink consumed by the printhead 106. Ink pump 110 or valve, in fluid communication with the ink bladder 104 and an ink reservoir 102, is controlled, based on the signal, to return the signal to its previous value and thus deliver a volume of ink to the ink bladder 104 that equals the volume of fluid consumed during actuation of the printhead 106. Accordingly, the volume of ink consumed during actuation of the printhead is restored to the bladder using a closed-loop control of the pump based on the sensor signal.

System 100 may be used in conjunction with various types of printheads that are capable of connection to a bulk ink system. System 100 may be used to prime the head, correct the ink pressure and calibrate it as well as it can keep the amount of ink constant for reliable operation. System 100 may also have a separator 108 that separates air, that may have entered the system, from ink so that the printhead 106 can continue its operation without losing any channels.

System 100 may be used to keep the physical amount of ink inside the reservoir constant in order to keep the pressure inside the ink bag to a constant level required by the printhead.

Unlike other systems that measure the ink pressure inside the supply system, the system shown herein measures ink used in microliters though change in physical dimensions of the bladder and compensates for used ink by feeding the ink using a high precision micro pump.

The separator 108 helps to increase the reliability of the system 100. The separator 108 separates air that entered into the system and directs it away from printhead using a vacuum pump 112.

The sensor 116 is also employed to facilitate detection of blocked or non-function print channels. This may be achieved by determining a relationship between change in sensor signal and volume of ink, employing the relationship to measure the volume of ink consumed during a print operation, and comparing the measured consumed volume of ink with an expected volume of ink that is calculated based on knowledge of the print operation.

The following examples are presented to enable those skilled in the art to understand and to practice embodiments of the present disclosure. They should not be considered as a limitation on the scope of the disclosure, but merely as being illustrative and representative thereof.

The specific embodiments described herein have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Figure 2:
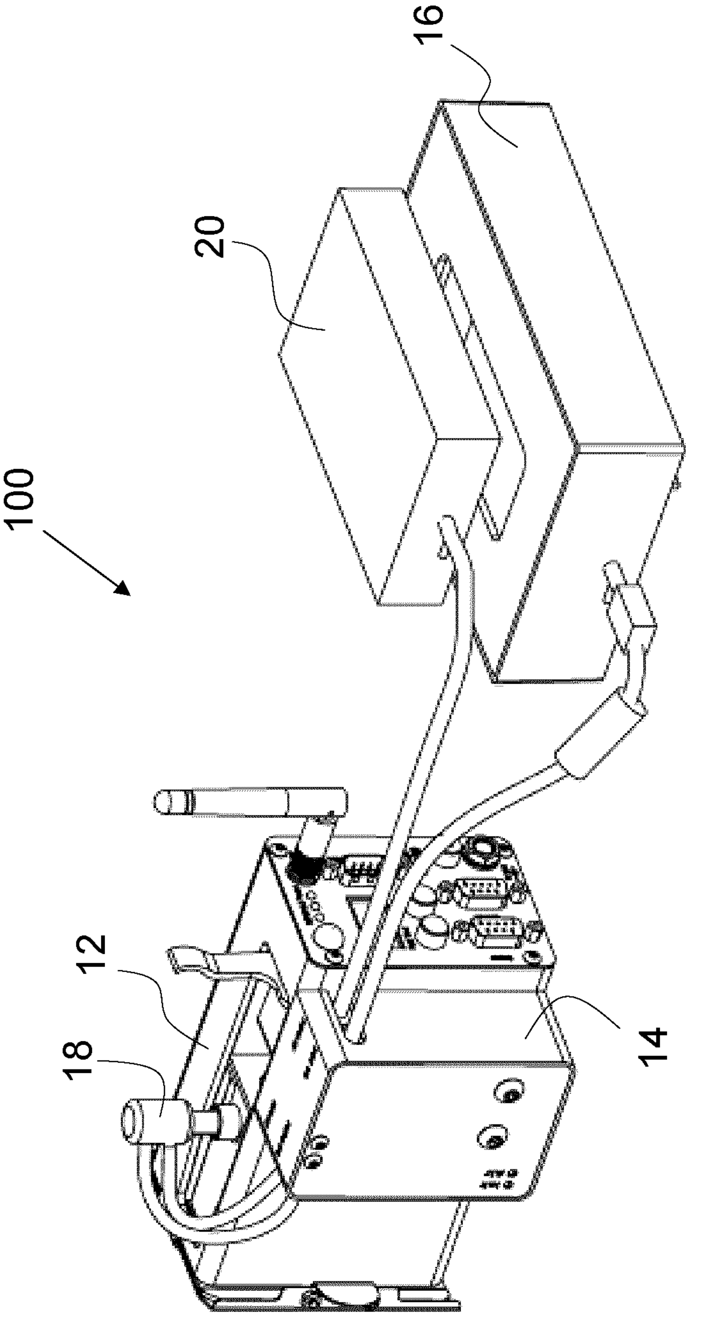
FIG. 2 is a perspective view of a system for delivering ink to a printhead.

Referring to FIG. 2, an inkjet printer assembly is shown generally at 10. The inkjet printer assembly 10 includes a printer housing 12, a pump unit 14, an ink reservoir 16, a separator 18 and an air bag 20.

Figure 3:
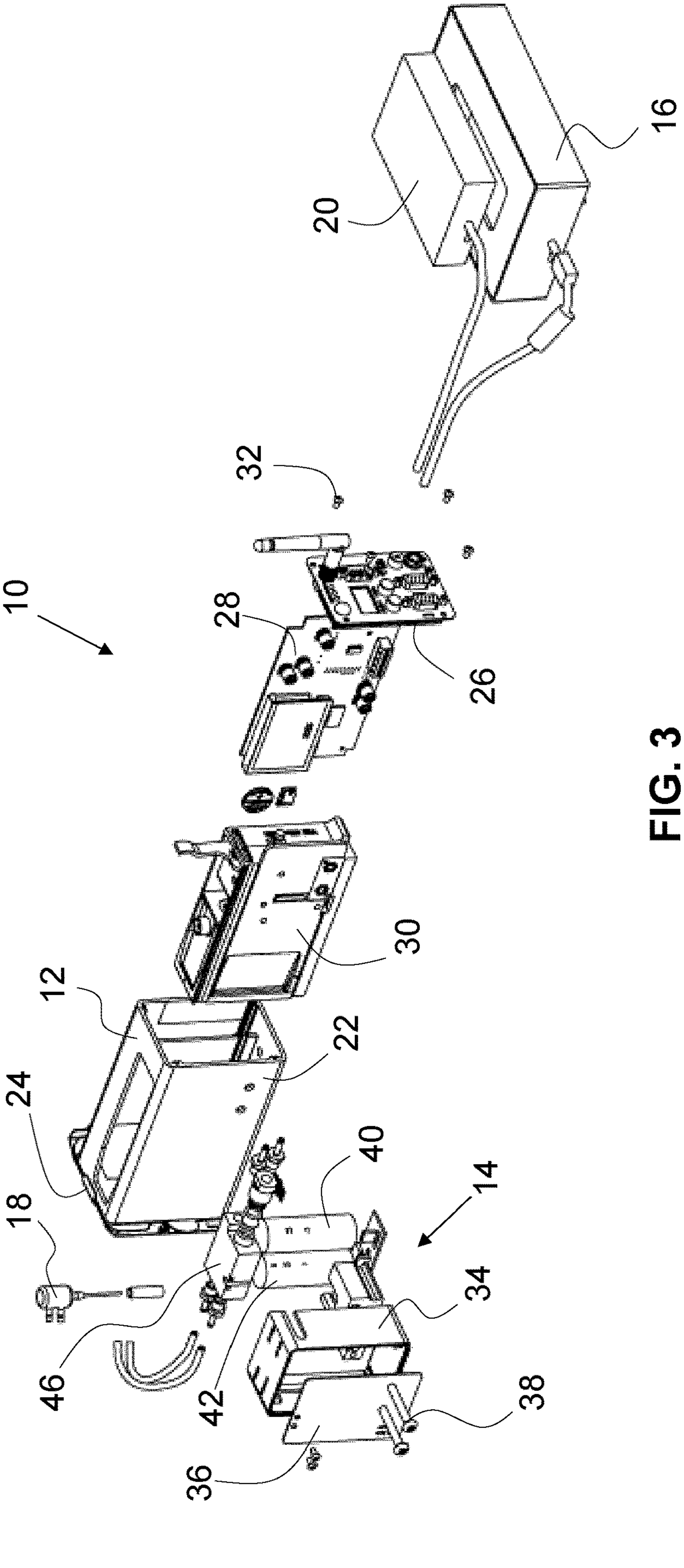
FIG. 3 is a blown apart view of the system of FIG. 2.
Figure 4:
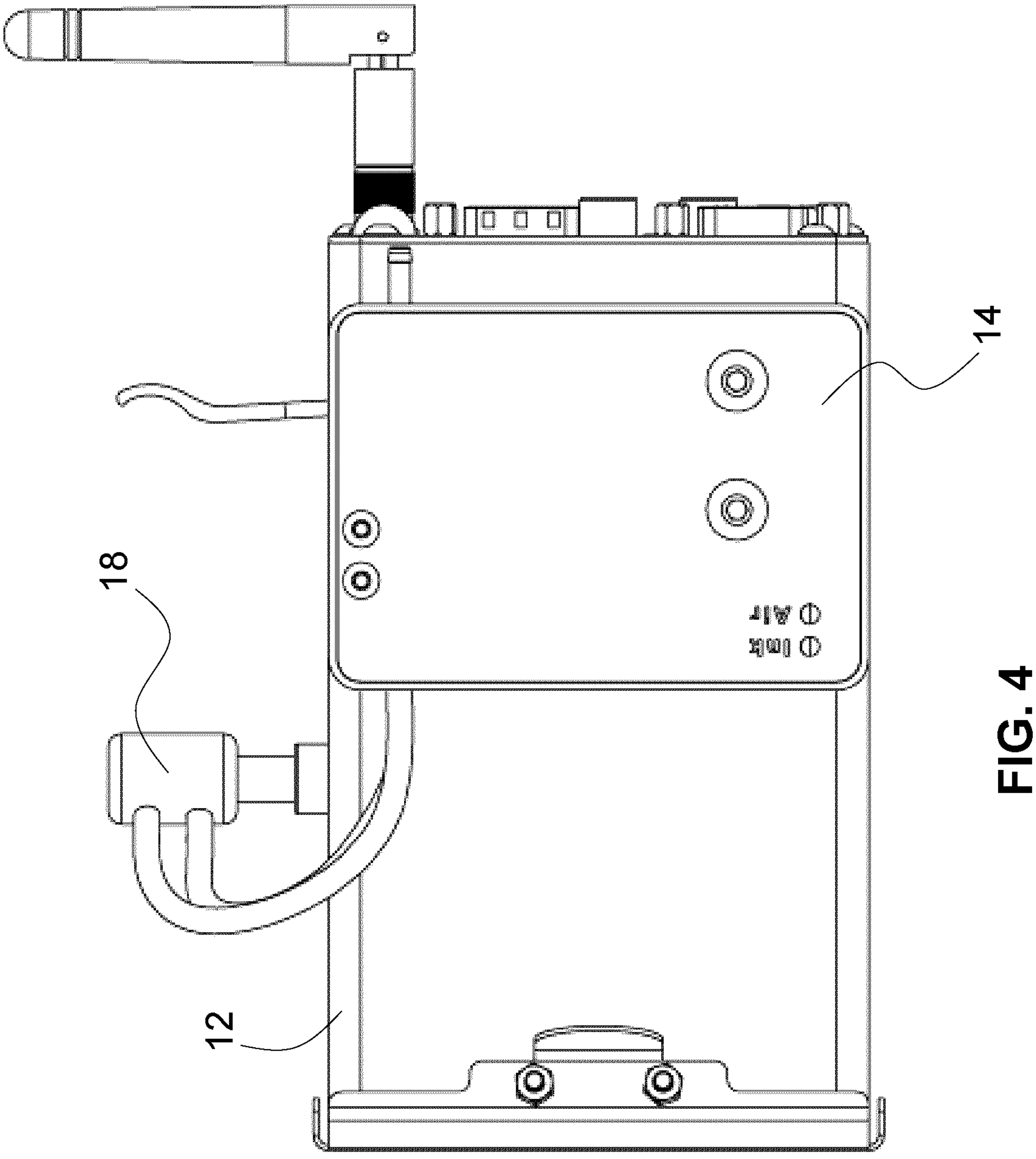
FIG. 4 is a side view of the system of FIG. 2 and FIG. 3.

Referring to FIG. 3, The printer housing 12 includes a body 22, a removable front sealing cap 24, a back 26 attached to the body 22. A central processing unit (CPU) or controller 28 is retained inside the printer housing 12. A cartridge housing assembly 30 is retained in the printer housing 12. A plurality of bolts 32 are used to attach the back 26 to the body 22.

Figure 11:
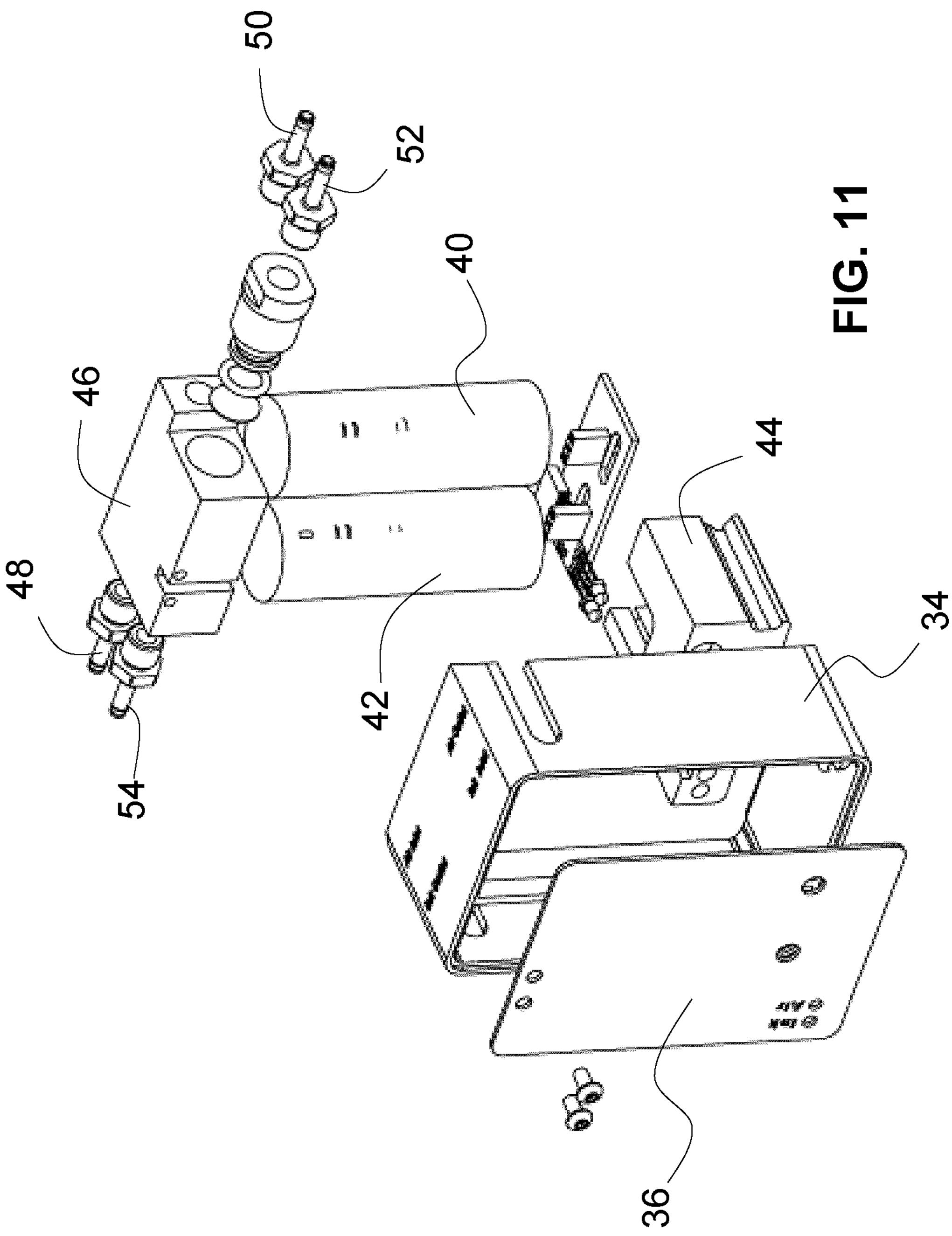
FIG. 11 is a blown apart perspective view of the pump assembly.

The pump unit 14 includes a pump unit body 34 and a pump unit front 36, as best seen in FIG. 11. The pump unit 14 is attached to the printer housing 12 and it serves as the back of the pump unit. A plurality of bolts 38 attach the pump unit 14 to the printer housing 12.

Referring to FIG. 11, An ink pump 40 and a vacuum pump 42 are attached to a pump base 44 retained in the pump unit 14. A manifold 46 is operably attached to the ink pump 40 and the vacuum pump 42 and is retained in the pump unit. The manifold 46 has a manifold air inlet 48, a manifold air outlet 50, a manifold ink inlet 52 and a manifold ink outlet 54.

Figure 5B:
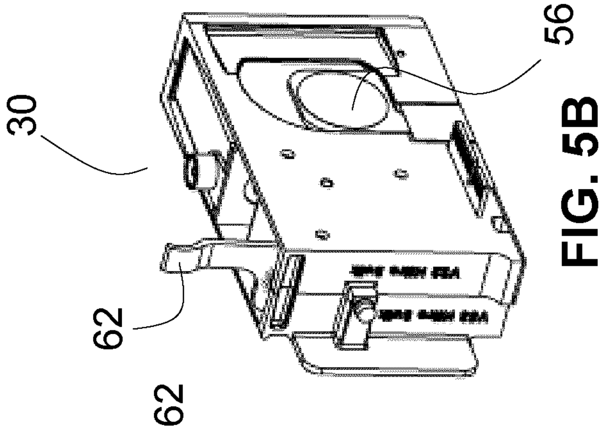
FIG. 5B is a perspective view of the cartridge housing shown in FIG. 5A as viewed from the other side.
Figure 5A:
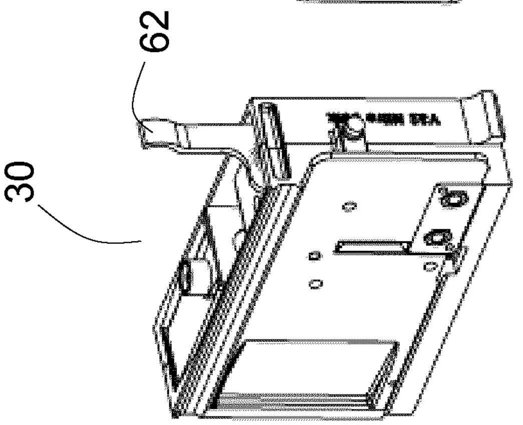
FIG. 5A is a perspective view of the cartridge housing and as used in the system of FIG. 2 and FIG. 3, as viewed from one side.
Figure 6:
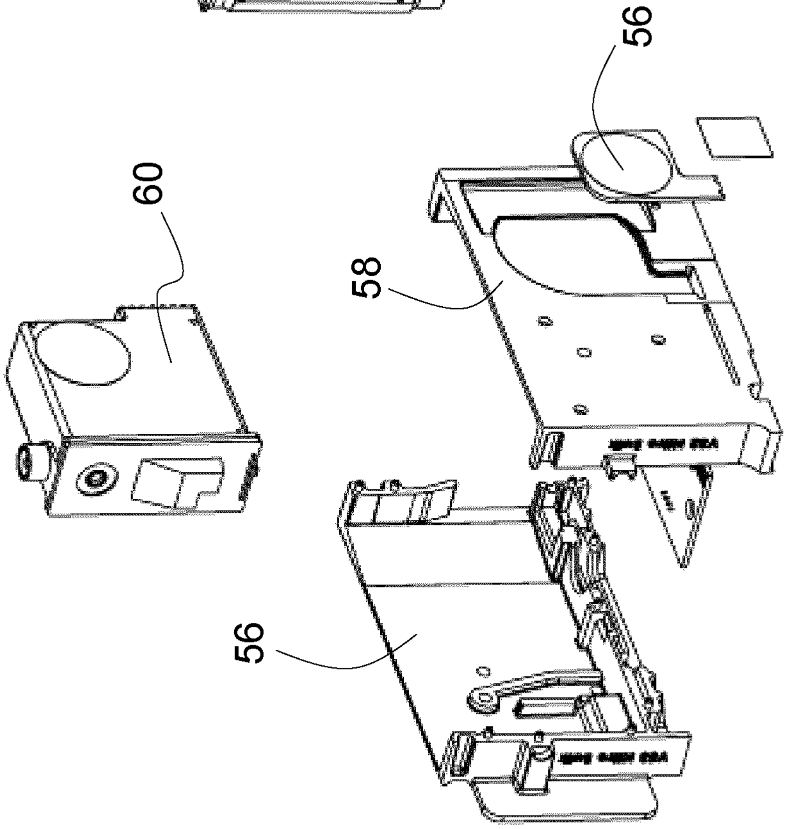
FIG. 6 is a blown apart perspective view of the cartridge housing of FIG. 5A and FIG. 5B.
Figure 7:
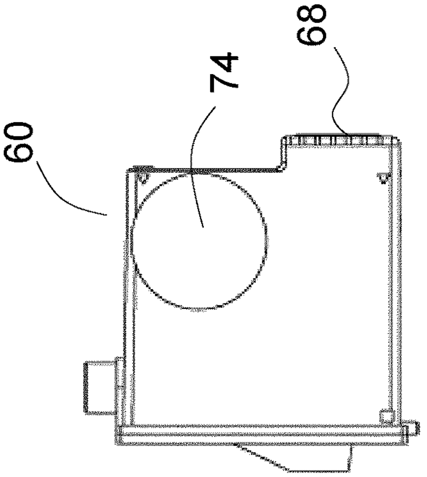
FIG. 7 is a side view of the cartridge used in the cartridge housing of FIG. 6.
Figure 8:
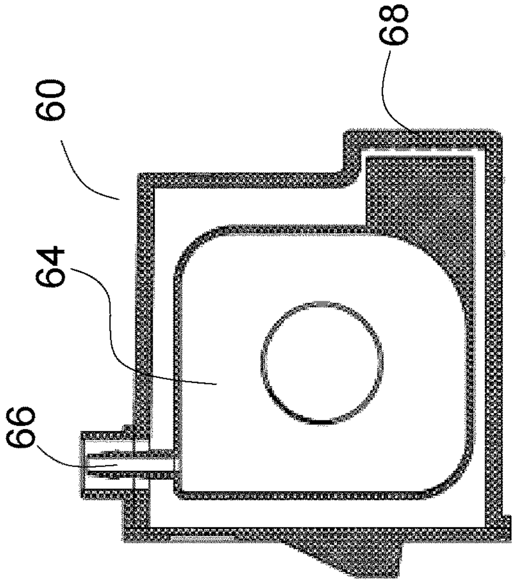
FIG. 8 is a sectional view of the cartridge of FIG. 7.
Figure 9:
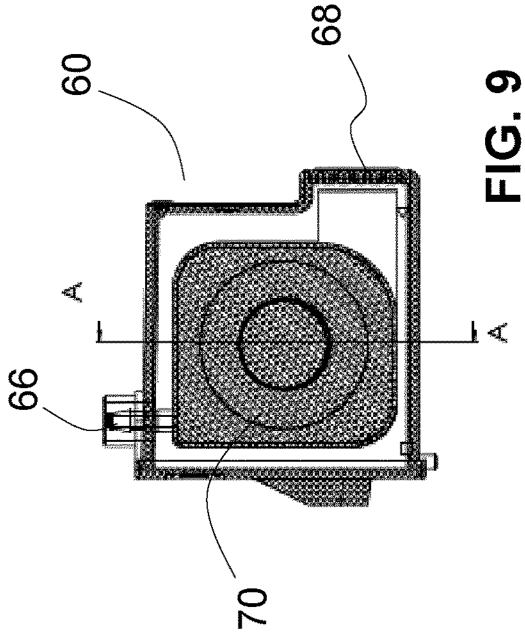
FIG. 9 is a sectional view of the cartridge, similar to that shown in FIG. 8 but showing the outside of the bladder.
Figure 10:
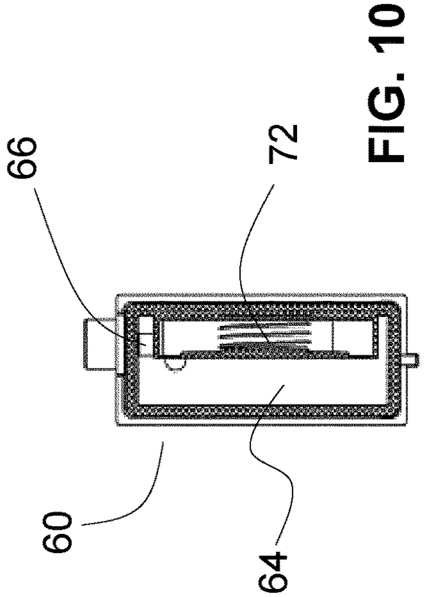
FIG. 10 is a cross sectional view of the cartridge of FIG. 9.

Referring to FIGS. 5 to 6, the cartridge housing assembly 30 includes a first and second portion operably attached together. An inductive sensor 56 is operably attached to the cartridge housing. The sensor 56 is operably connected to the diaphragm 70 (shown in FIGS. 7 and 9). The sensor 56 generates a signal responsive to movement of the diaphragm 70. The inductive sensor 56 is used to determine the ink usage. The AC magnetic field from the sensor causes eddy currents to form on the surface of the conductor. Eddy currents create an opposing magnetic field which effectively reduces the inductance of the inductive sensor. The inductance changes as a function of distance. An ink cartridge 60 is releasably retained in the cartridge housing 30. A lever 62 holds the ink cartridge in place when positioned in the cartridge housing 30.

Referring to FIGS. 7 to 10, the cartridge 60 is connectable to the separator 18. A bladder 64 is housed in the cartridge. The bladder 64 has a port 66. The bladder 64 delivers ink to the printhead 68. The cartridge 60 may also include an RFID tag 74 or another marking.

The bladder 64 defines a volume for receiving ink. The bladder 64 is flexible and thus the volume can change during use. In one embodiment the bladder 64 is an aluminum bladder. Alternatively, the bladder may be made of plastic. The bladder 64 includes a diaphragm 70. The bladder can be part of printhead or a subpart of an ink delivery system. A bladder is composed from a chamber with an inlet and an outlet. One of its walls is metal film or may be plastic film and is called diaphragm. A metal spring inside the bladder pushes diaphragm out. There is a thin plastic disc between the spring and the diaphragm to prevent damage to diaphragm by metal spring. In case plastic film diaphragm is used the sensor will measure the spring movement. A spring 72 is positioned between the bladder 64 and the inside of the ink cartridge 60.

Figure 12:
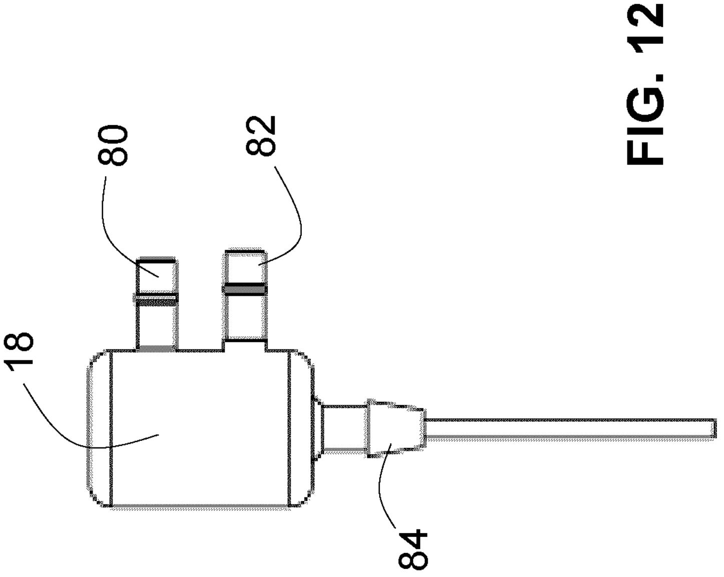
FIG. 12 is an enlarged side view of the separator included in the system of FIG. 2 and FIG. 3.

Referring to FIG. 12, the separator 18 has an ink inlet port 80 and an air outlet port 82. The separator 18 also has a cartridge port 84. The cartridge port 84 is operably connected to the bladder 64 in the cartridge 60. Air is sucked from the bladder 64 through the cartridge port 84 and ink is delivered to the bladder 64 through the cartridge port 84.

An ink valve 86 and ink filter 88 are in flow communication between the ink reservoir 16 and the ink separator 18.

The ink reservoir 16 is operably in fluid communication with the ink pump 40 and the separator 18. In the embodiment herein the ink pump 40 is a high precision micro pump. The separator 18 is in fluid communication with the ink bladder 64. The air bag 20 is operably in fluid communication with the vacuum pump 42 and the separator 18. The air bag 20 is used to collect air removed by the separator 18.

The CPU or controller 28 is operably connected to the ink pump 40, the vacuum pump 42 and the sensor 56. The controller 28 activates the ink pump 40 responsive to signals from the sensors. The controller 28 activates the vacuum pump 42 pursuant to protocols such as the primer protocol described below.

In use during actuation of the printhead 68, the resulting vacuum draws ink from the ink bladder 64, compressing the ink bladder 64, and leading to a change in signal that is correlated with the volume of ink consumed by the printhead 68. In the embodiment shown herein ink pump 40 is in fluid communication with the ink bladder 64 and an ink reservoir 16, is controlled, based on the signal, to return the signal to its previous value and thus deliver a volume of ink to the ink bladder 64 that equals the volume of fluid used during actuation of the printhead 68. Accordingly, the volume of ink used during actuation of the printhead is restored to the bladder using a closed-loop control of the pump based on the sensor signal.

In the embodiment shown herein the ink reservoir may be positioned at any height. Alternatively, the ink reservoir may be positioned at a height relative to the bladder such that sufficient pressure may be maintained in the bladder and then the ink pump is not required. Where the ink reservoir is positioned to provide pressure there is provided a valve between the ink reservoir and the separator to control the flow of ink. Accordingly, the ink pump or the alternative ink reservoir positioning to provide pressure with a valve provide an ink delivery device which is connectable to and in fluid communication with the ink reservoir.

Figure 13A:
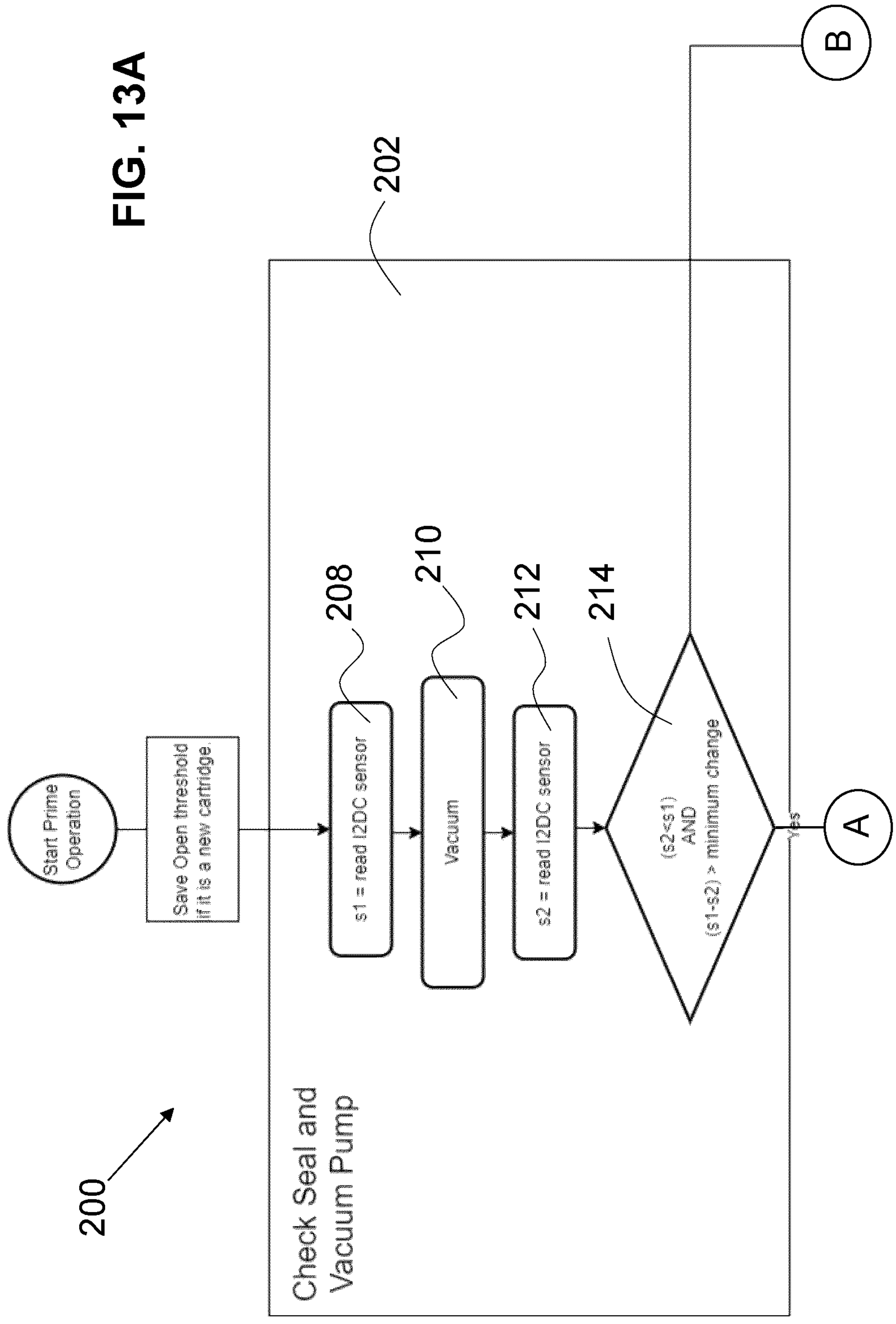
FIG. 13A is a flow chart showing the beginning portion of a prime operation.
Figure 13B:
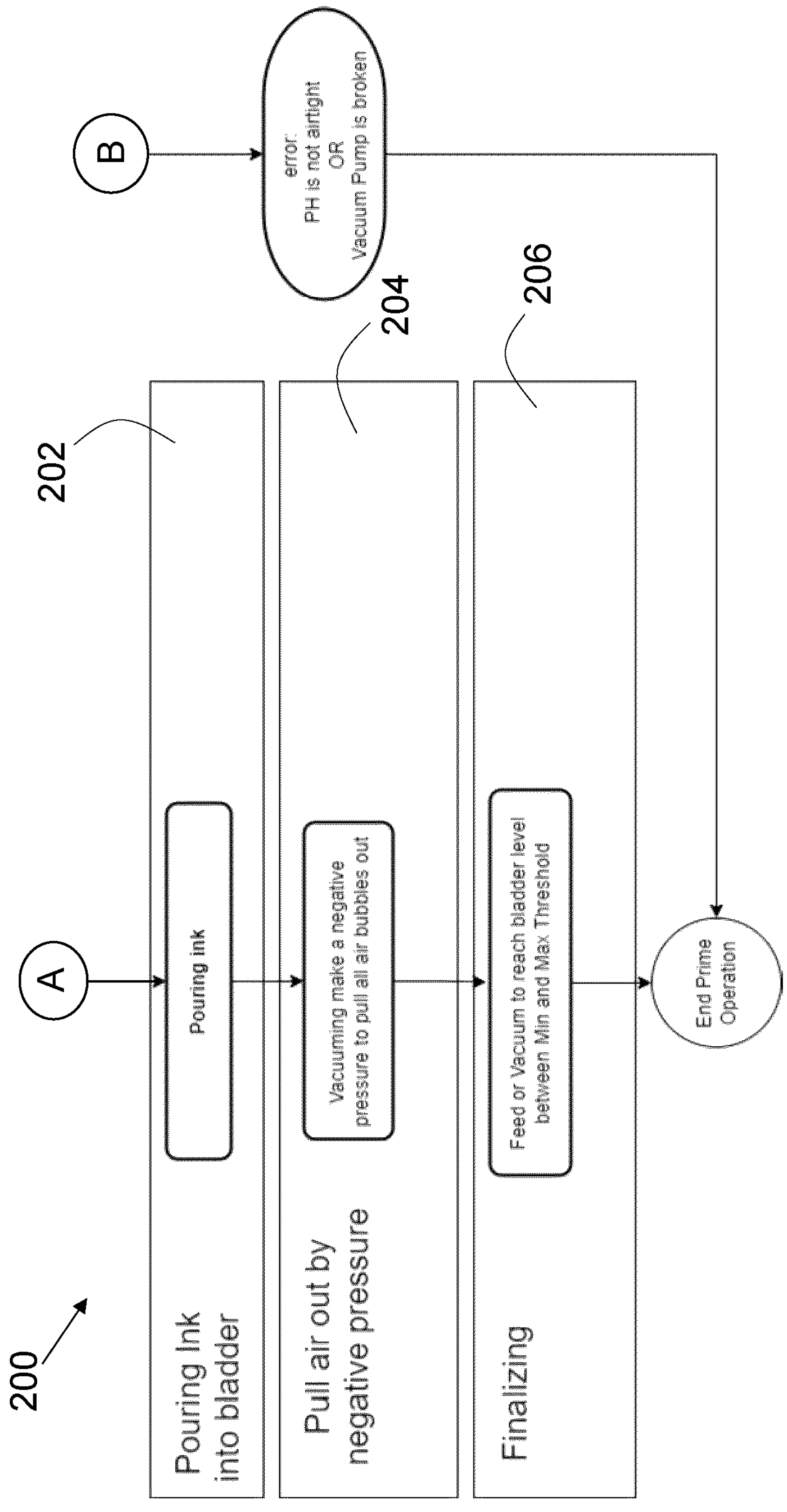
FIG. 13B is a flow chart showing the end portion of the prime operation of FIG. 13A.

The system shown herein may be used to prime a new ink cartridge. The steps used to prime the ink cartridge are shown in FIG. 13A and FIG. 31B generally at 200. After the cartridge 60 is positioned in the inkjet printer assembly 10, the separator 18 is attached to the cartridge 60. The user then needs to determine 202 that there is a good seal between the cartridge 60 and the separator 18. Once it is confirmed that there is a good seal, ink is then provided to the cartridge 204. The vacuum pump 42 is used to pull air out of the cartridge 60 to ensure that air bubbles are pulled out of the bladder 64. Confirm that the bladder 64 is within a predetermined range.

To determine if there is a good seal 202, a reading is taken with sensor 56, as shown at 208. The vacuum pump 42 is activated, as shown at 210. A second reading is taken with sensor 56, as shown at 212. Determine as shown at 214 if the second reading is less than the first reading AND determine if the first reading less the second reading is greater than a minimum predetermined change AND if yes then proceed but if no then there is not a good seal or the vacuum pump is malfunctioning.

A system for delivering ink to a printhead is for use with an ink reservoir 102. The ink delivery system includes an ink delivery device 100, a vacuum pump 112, a bladder 64, a sensor 116, a separator 108 and a controller 114. The ink delivery device is connectable to and in fluid communication with the ink reservoir 102. The vacuum pump 112 is operably connected to and in fluid communication with the ink reservoir 102. The bladder defines a volume. The sensor 116 is operably connected to the bladder 104 and the sensor 116 generates a signal responsive to volume of ink in the bladder 104. The separator 108 is operably connected to and in fluid communication with the ink delivery device, the vacuum pump 112 and the bladder 104. The controller 114 is operably connected to the sensor 116 for determining the change in the size of the bladder 104 and thereby determining ink usage and the controller 114 being operably connected to the ink delivery device.

A system for delivering ink to a printhead for use with an ink reservoir, the ink delivery system includes an ink delivery device, a bladder, a sensor, and a controller. The ink delivery device is connectable to and in fluid communication with the ink reservoir. The bladder defines a volume. The bladder is operably connected to and in fluid communication with the ink delivery device. The bladder has a diaphragm as a portion thereof. The sensor is operably connected to the diaphragm, the sensor generating a signal responsive to movement of the diaphragm. The controller is operably connected to the sensor for determining the change in the size of the bladder and thereby determining ink usage and the controller being operably connected to the ink delivery device.

The ink delivery device may be an ink pump. The ink pump may be a high precision micro pump.

The ink delivery system may further include a valve operably connected and in fluid communication between the ink pump and the ink reservoir.

The sensor 116 may be an induction sensor.

The bladder 104 may be an aluminum bag.

The ink delivery system may further include a spring operably attached to the inside of the bladder and configured to apply pressure to the bladder. Changes in the spring may correspond to ink usage.

The controller 114 may activate the ink delivery device to deliver ink from the ink reservoir based on the determined ink usage.

The sensor may be an induction sensor.

The controller may activate the ink delivery device to deliver ink from the ink reservoir based on the determined ink usage.

The ink delivery system may include a separator and a vacuum pump wherein the ink delivery device is operably connected to and in flow communication with the separator, the vacuum pump is operably connected to and in fluid communication with the separator and the ink reservoir, and the separator is operably connected to and fluid communication with the bladder.

The ink reservoir may be positioned to provide ink under pressure to the bladder and the ink delivery device is a valve.

A method of priming a bladder for use with an inkjet printing system, and an ink reservoir; the ink delivery system having a bladder, an ink delivery device for delivering ink to the bladder, a separator in fluid connection with the bladder and a vacuum pump in fluid connection with the separator, and a sensor operably connected to the bladder, the method comprising the steps of:

- checking the seal between the bladder and the separator and determining if within acceptable limits;
- if within acceptable limits then pouring ink into bladder;
- vacuuming air out of bladder;
- determining if bladder level within a predetermined range.

The checking step may include the steps of taking a first sensor reading; vacuuming the air out of the bladder; taking a second sensor reading; determining if the second reading is less than the first reading AND determining if the first reading less the second reading is greater than a minimum predetermined change; if yes then proceeding.

The invention claimed is:

1. A system for delivering ink to a printhead for use with an ink reservoir, the ink delivery system comprising:

- a high precision micro pump connectable to and in fluid communication with the ink reservoir;
- a vacuum pump operably connected to and in fluid communication with the ink reservoir;
- a bladder defining a volume;
- a sensor operably connected to the bladder, the sensor generating a signal responsive to volume of ink in the bladder;
- a separator operably connected to and in fluid communication with the high precision micro pump, the vacuum pump and the bladder; and
- a controller being operably connected to the sensor for determining the change in the size of the bladder and thereby determining ink usage and the controller being operably connected to the the high precision micro pump.

2. The ink delivery system as claimed in claim 1 further including a valve operably connected and in fluid communication between the ink pump and the ink reservoir.

3. The ink delivery system as claimed in claim 1 wherein the bladder is an aluminum bag.

4. The ink delivery system as claimed in claim 3 further including a spring operably attached to the inside of the bladder and configured to apply pressure to the bladder.

5. The ink delivery system as claimed in claim 4 wherein changes in the spring correspond to the ink usage.

6. The ink delivery system as claimed in claim 1 wherein the controller activates the ink delivery device to deliver ink from the ink reservoir based on the determined ink usage.

7. A system for delivering ink to a printhead for use with an ink reservoir, the ink delivery system comprising:

- an ink delivery device connectable to and in fluid communication with the ink reservoir;
- a vacuum pump operably connected to and in fluid communication with the ink reservoir;
- a bladder defining a volume;
- an induction sensor operably connected to the bladder, the induction sensor generating a signal responsive to volume of ink in the bladder;
- a separator operably connected to and in fluid communication with the ink delivery device, the vacuum pump and the bladder; and
- a controller being operably connected to the sensor for determining the change in the size of the bladder and thereby determining ink usage and the controller being operably connected to the ink delivery device.

8. A system for delivering ink to a printhead for use with an ink reservoir, the ink delivery system comprising:

- a high precision micro pump connectable to and in fluid communication with the ink reservoir;
- a bladder defining a volume, the bladder being operably connected to and in fluid communication with the high precision micro pump, the bladder having a diaphragm as a portion thereof;
- a sensor operably connected to the diaphragm, the sensor generating a signal responsive to movement of the diaphragm; and
- a controller being operably connected to the sensor for determining the change in the size of the bladder and thereby determining ink usage and the controller being operably connected to high precision micro pump.

9. The ink delivery system as claimed in claim 8 further including a valve operably connected to and in fluid communication between the feed pump and the ink reservoir.

10. The ink delivery system as claimed in claim 8 wherein the bladder is an aluminum bag.

11. The ink delivery system as claimed in claim 10 further including a spring operably attached to the inside of the bladder and configured to apply pressure to the bladder.

12. The ink delivery system as claimed in claim 11 wherein changes in the spring correspond to ink usage.

13. A system for delivering ink to a printhead for use with an ink reservoir, the ink delivery system comprising:
- an ink delivery device connectable to and in fluid communication with the ink reservoir;
- a bladder defining a volume, the bladder being operably connected to and in fluid communication with the ink delivery device, the bladder having a diaphragm as a portion thereof;
- an induction sensor operably connected to the diaphragm, the sensor generating a signal responsive to movement of the diaphragm; and
- a controller being operably connected to the sensor for determining the change in the size of the bladder and thereby determining ink usage and the controller being operably connected to the ink delivery device.

14. The ink delivery system as claimed in claim 8 wherein the controller activates the ink delivery device to deliver ink from the ink reservoir based on the determined the ink usage.

15. The ink delivery system as claimed in claim 8 further including a separator and a vacuum pump wherein the ink delivery device is operably connected to and in flow communication with the separator, and the vacuum pump is operably connected to and in fluid communication with the separator and the ink reservoir, and the separator is operably connected to and fluid communication with the bladder.

16. The ink delivery system as claimed in claim 8 wherein the ink reservoir is positioned to provide ink under pressure to the bladder and the ink delivery device is a valve.

17. A method of priming a bladder for use with an inkjet printing system, and an ink reservoir; an ink delivery system having a bladder, a high precision micro pump for delivering ink to the bladder, a separator in fluid connection with the bladder and a vacuum pump in fluid connection with the separator, and a sensor operably connected to the bladder, the method comprising the steps of:
- checking a seal between the bladder and the separator and determining if the seal is within acceptable limits;
- if within acceptable limits then pouring ink into the bladder;
- vacuuming air out of the bladder; and
- determining if the bladder has a level within a predetermined range.

18. The method as claimed in claim 17 wherein the checking step includes the steps of taking a first sensor reading; vacuuming the air out of the bladder; taking a second sensor reading; determining if the second reading is less than the first reading and determining if the first reading less the second reading is greater than a minimum predetermined change; if yes then proceeding.

19. A method of priming a bladder for use with an inkjet printing system, and an ink reservoir; an ink delivery system having a bladder, an ink delivery device for delivering ink to the bladder, a separator in fluid connection with the bladder and a vacuum pump in fluid connection with the separator, and an induction sensor operably connected to the bladder, the method comprising the steps of:
- checking a seal between the bladder and the separator and determining if the seal is within acceptable limits;
- if within acceptable limits then pouring ink into the bladder;
- vacuuming air out of the bladder; and
- determining if the bladder has a level within a predetermined range.

20. The method as claimed in claim 19 wherein the checking step includes the steps of taking a first sensor reading; vacuuming the air out of the bladder; taking a second sensor reading; determining if the second reading is less than the first reading and determining if the first reading less the second reading is greater than a minimum predetermined change; if yes then proceeding.

* * * * *